United States Patent [19]
Estes

[11] Patent Number: 5,996,771
[45] Date of Patent: Dec. 7, 1999

[54] HIGH SPEED SHUTTLE CONVEYOR SYSTEM

[75] Inventor: Larry E. Estes, Northville, Mich.

[73] Assignee: Central Conveyor Company, Brighton, Mich.

[21] Appl. No.: 08/982,153

[22] Filed: Dec. 1, 1997

[51] Int. Cl.[6] ............................. B65G 17/42; B65G 17/30
[52] U.S. Cl. .................... 198/686; 198/687.1; 198/465.4
[58] Field of Search ............................. 198/465.4, 687.1, 198/686

[56] References Cited

U.S. PATENT DOCUMENTS

| | | |
|---|---|---|
| 3,180,279 | 4/1965 | Thibault . |
| 3,199,843 | 8/1965 | Abbey ................................... 198/465.4 |
| 4,669,388 | 6/1987 | Dehne et al. . |
| 5,322,156 | 6/1994 | Kakita et al. . |
| 5,839,371 | 9/1996 | Knuttel .................................. 198/689 |

FOREIGN PATENT DOCUMENTS

| | | | |
|---|---|---|---|
| 2659-946 | 9/1991 | France | ................................. 198/465.4 |
| 2100570 | 3/1978 | Germany | ............................. 198/465.4 |

*Primary Examiner*—William E. Terrell
*Assistant Examiner*—Mark A. Deuble
*Attorney, Agent, or Firm*—Charles W. Chandler

[57] ABSTRACT

A high speed shuttle conveyor includes two motor-driven belts for moving two carriages forwardly to rapidly propel an article conveyor from a starting position to an ending position. The belt movements are reversed to return the carriages to the starting position. Each carriage has a retractable pusher element for imparting forward movement to the article conveyor, and a retractable retention element for preventing the article conveyor from moving forwardly at a faster speed than the pusher element. When each carriage reaches the limit of its forward stroke the retention elements exert snubber actions on the carrier; the carrier is safely decelerated to a motionless condition and released.

5 Claims, 3 Drawing Sheets

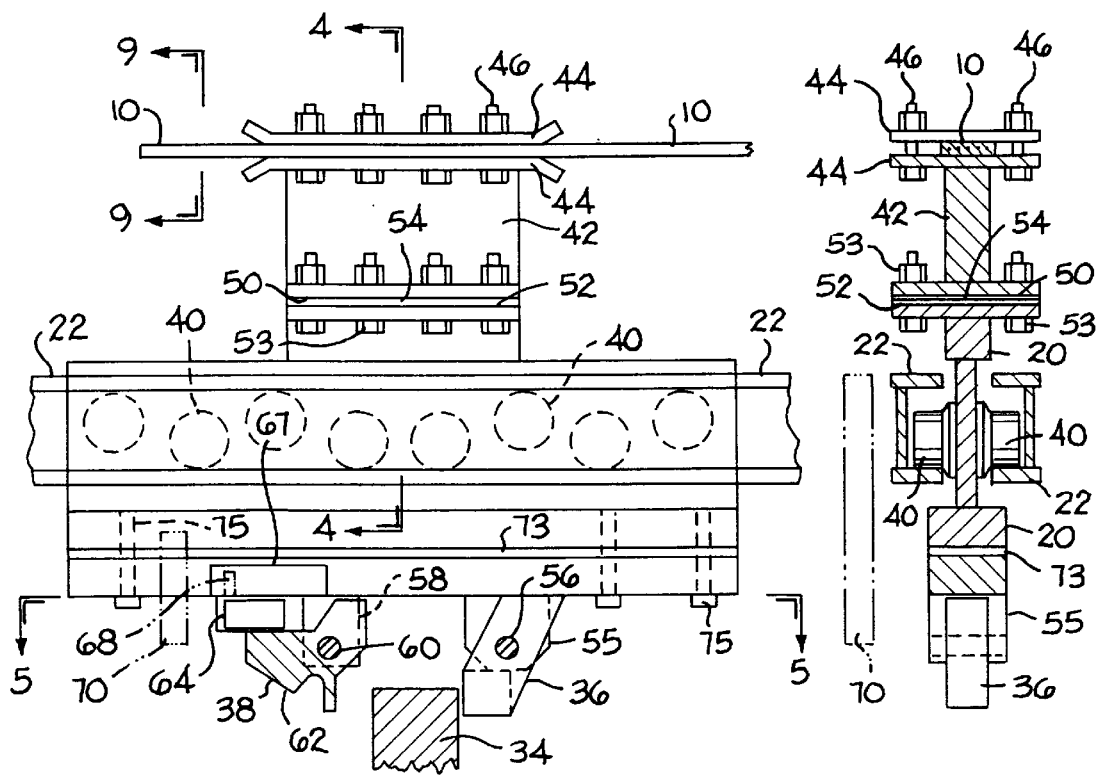
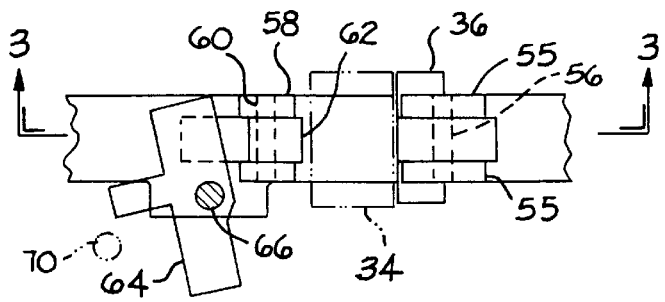

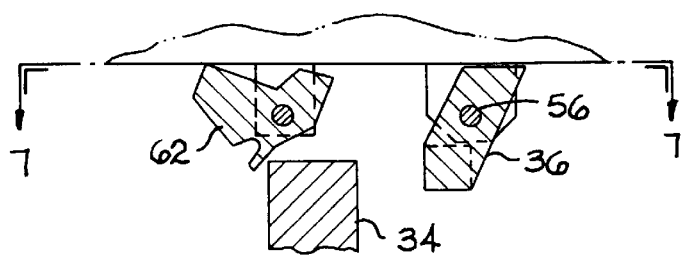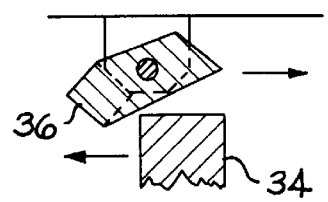
FIG. 6  FIG. 8
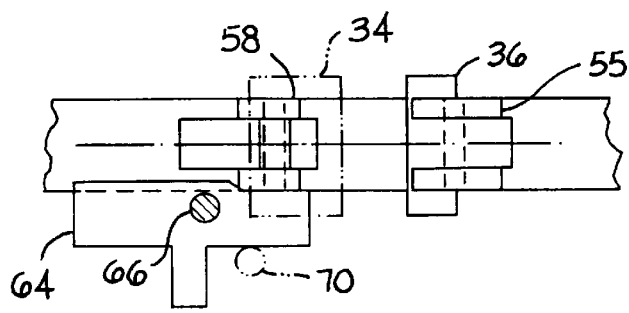
FIG. 7
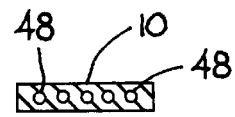
FIG. 9

HIGH SPEED SHUTTLE CONVEYOR SYSTEM

BACKGROUND OF THE INVENTION

This invention relates to a high speed shuttle conveyor for transferring an article carrier along a predetermined path, e.g. from one work area to another work area. The shuttle conveyor can increase the overall speed of the conveyor system while permitting each article conveyor to remain at any given work area for a relatively long period of time. The invention has particular application for shifting heavy automobile bodies along a conveyor path during automobile assembly operations.

Shuttle conveyors are known in the prior art. U.S. Pat. No. 5,322,156 shows a shuttle conveyor system comprising plural pairs of drive belts that overlap in the direction of belt travel, whereby an automobile body can be transferred from one pair of belts to another pair. The belts apparently slide on flat support surfaces in order to preclude buckling of the belts under the heavy loads imposed by the automobile body.

U.S. Pat. No. 3,180,279, to P. Thibault, shows an overhead chain conveyor system having stationary tracks at spaced points for temporarily retaining an article carrier while the conveyor chain continues to move at normal speed.

U.S. Pat. No. 4,669,388 to C. Dehne et al. shows a conveyor system that includes a carriage that can be successively detached from an article carrier and then reattached to the carrier for achieving a variable speed advance of the carrier along the conveying path.

The present invention relates to a high speed shuttle conveyor system that includes overhead belt means designed to move a carriage means rapidly back and forth in a horizontal motion above an article carrier that is supported for guided motion along a separate rail system. The carriage means has detachable connections with the article carrier so that when the carrier is under the control of the carriage means, the carrier is propelled along the rail system at a higher than normal speed.

The overhead belt means is cyclically movable back and forth, whereby the carriage is enabled to propel an article carrier in the forward direction, and to then return to a starting position to pick up another article carrier. A principal aim of the invention is to provide a high speed shuttle system that separates in cyclic fashion without having to remove each article carrier from the support rail. The shuttle system pushes each article carrier while the carrier continues to be supported by the rail.

In the preferred practice of the invention, the shuttle system carriage has a deceleration mechanism that decelerates each carrier to a motionless (or near motionless) condition as the carriage nears the end of its forward travel. The carriage operates at a relatively high speed without generating dangerous uncontrolled accelerations of the article conveyor. The system is designed to safely handle heavy articles, such as automobile bodies weighing in excess of 3 thousand pounds with an article carrier of 4 thousand pounds.

Features of the invention will be apparent from the drawings and accompanying description of an illustrative embodiment of the invention.

BRIEF DESCRIPTION OF THE DRAWINGS

The description refers to the accompanying drawings in which like reference characters refer to like parts throughout the several views, and in which:

FIG. 3 is an enlarged side elevational view of a shuttle conveyor carriage used in the FIG. 1 system. Portions of FIG. 3 are shown in section, along section line 3—3 in FIG. 5;

FIG. 4 is a sectional view taken on line 4—4 in FIG. 3;

FIG. 5 is a view taken essentially on line 5—5 in FIG. 3;

FIG. 6 is a fragmentary longitudinal sectional view of the FIG. 5 structure, but with certain components advanced in the direction of conveyor movement;

FIG. 7 is a view taken on line 7—7 in FIG. 6;

FIG. 8 is a fragmentary sectional view of a pusher element used in the FIG. 3 construction, and showing the element being deflected during the return stroke of the shuttle carriage; and FIG. 9 is a fragmentary enlarged sectional view taken on line 9—9 in FIG. 3.

DESCRIPTION OF THE PREFERRED EMBODIMENT

Figure 1:
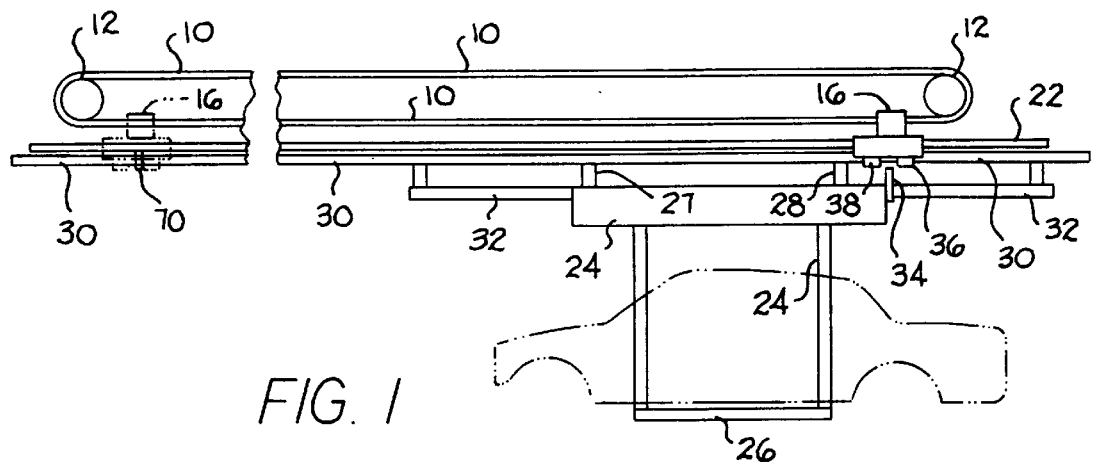
FIG. 1 is a side elevational view of a shuttle conveyor system embodying features of the invention.
Figure 2:
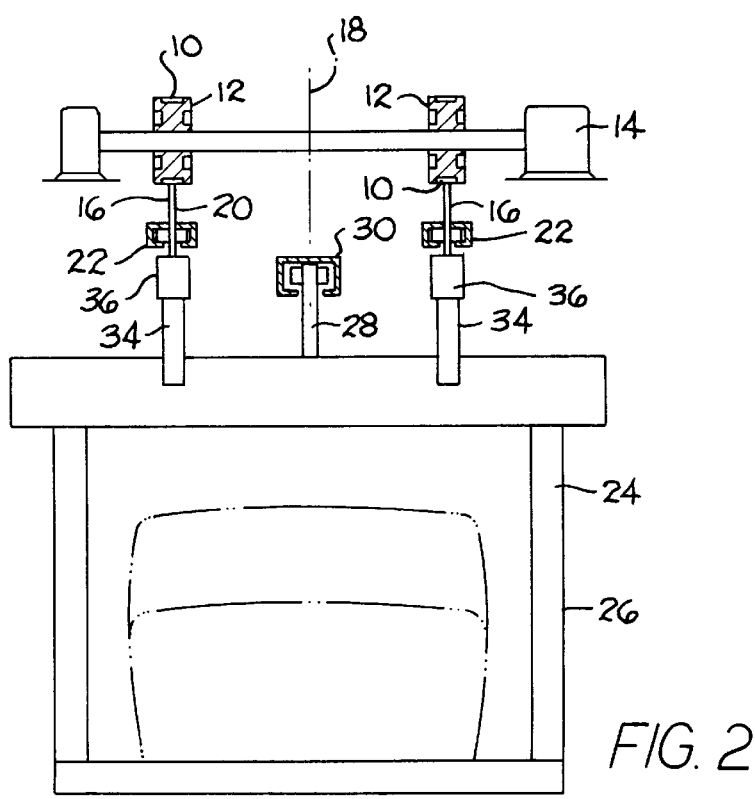
FIG. 2 is a right end view of the FIG. 1 shuttle conveyor system, somewhat enlarged to better illustrate structural features.

FIGS. 1 and 2 show a shuttle conveyor system embodying features of the invention. The system comprises two overhead drive belts 10 trained around pulleys 12.

Both drive belt pulleys are driven by a reversible electric motor 14, whereby the lower runs of the two belts can cycle back and forth in a horizontal plane. The lower run of each drive belt 10 is connected to a carriage 16. As shown in FIG. 2, each carriage 16 is spaced equidistant from the longitudinal midplane 18 of the conveyor system. Each carriage comprises a wall structure 20 extending generally vertically through a longitudinal track structure 22 located directly below the associated belt 10.

Each track structure 20 supports the associated carriage 16 for horizontal guided motion in a right-to-left direction (in FIG. 1), such that belts 10 are relieved of vertical loadings. Belts 10 are subjected only to horizontal loadings in the direction of belt travel.

Each carriage 16 has a starting position near the rightmost set of pulleys 12 and an ending position proximate the leftmost set of pulleys. In FIG. 1 the starting position of each carriage is shown in full lines; the ending position of each carriage is shown in dashed lines.

After each forward stroke of the carriages, motor 14 is reversed to return the two carriages from the ending position back to the starting position. During each forward stroke the carriages propel an article carrier 24 in a left-to-right direction at a relatively high speed, e.g. three to four feet per second. The return stroke is used to reposition carriages 16 at the starting position, in readiness for connection to another (new) article carrier.

Each article carrier 24 comprises a frame structure 26 supporting a relatively heavy article, such as an automobile body. Frame structure 26 has suspension arms 27 and 28 at its leading and trailing ends, each suspension arm having an array of rollers positioned in an overhead monorail 30, whereby the article carrier is supported for guided motion through the space below drive belts 10. The article carrier is thus supported on a rail system separate from track structures 22, such that the article carrier does not impose any vertical loads on carriages 16. The carriages 16 are used for applying forward propelling forces to the article carrier, whereby the carrier can be moved at a relatively high speed from the starting position to the ending position.

Article carrier 24 is equipped with an overhead longitudinal bar 32 that can be attached to a slow speed propulsion system (not shown), whereby the article carrier 24 can be delivered to the starting position (shown in FIG. 1) and later removed from the final ending position. Monorail 30 can be used for supporting the article carrier during its entire motion along the conveyor system, i.e. during the slow speed motion and during the high speed motion achieved with the belt-driven carriage 16.

Article carrier 24 has two upstanding arms 34 at its trailing ends adapted to register with two pusher elements 36 depending from carriages 16. As the carriages move forward in a right-to-left direction (FIG. 1) pusher elements 36 apply propulsion forces to arms 34, thereby moving article carrier 24 forwardly at a high speed related to the linear speeds of drive belts 10.

Each carriage 16 has a depending arm retention means 38 spaced forwardly from the associated pusher element 36, such that each arm 34 is positioned between a pusher element 36 and a retention means 38 during forward motions of the carriages. Each retention means 38 acts as a stop or abutment, to prevent the article carrier from accelerating away from pusher element 36 in an uncontrolled fashion. During high speed motion of each carriage, the relatively heavy article carrier can develop a considerable inertia force; retention mechanisms 38 prevent the article carrier from moving faster than pusher elements 36.

Preferably each retention means 38 has a braking capability for decelerating the article carrier 24 when carriages 16 near the ending positions (dashed lines in FIG. 1). By braking or decelerating the article carrier, the carrier is prevented from overshooting its target position or damaging the article or other structures that might be forcibly impacted by the carrier. The aim is to achieve high speed motion of the article carrier between the starting and ending positions, while at the same time bringing the carrier safely to a motionless, or near motionless, condition at the downstream end of the belt-driven shuttle conveyor.

Each pusher element 36 and retention means 38 is retractable so as to be capable of clearing the upstanding arms 34 during the carriage return stroke to the starting position.

FIGS. 3 through 9 illustrate in somewhat greater detail specific structural features of the carriage 16 used to accomplish the objects of the invention. FIGS. 3 through 9 illustrate one of the two carriages. The other carriage (not shown) is a mirror image of the illustrated carriage.

As shown in FIGS. 3 and 4, the carriage comprises a lower wall structure 20 extending through the space between two opposed tracks 22. Rollers 40 are mounted on wall structure 20 for disposition in the opposed tracks, whereby the carriage is mounted for guided movement along the track. Rollers 40 are staggered vertically, as shown in FIG. 3, to prevent vertical play of the carriage. Horizontal rollers 41 prevent horizontal movement of the carriage.

The carriage further comprises an upper wall structure 42 clamped to drive belt 10. As shown in FIGS. 4 and 9, the drive belt has a rectangular cross section, dimensioned to provide two parallel flat belt major faces in the horizontal plane and two relatively narrow edge surfaces in the vertical plane. Wall structure 42 comprises two parallel flat plates 44 clamped to the major belt faces by two rows of clamping bolts 46 located outside of the belt side edges so as to avoid any weakening of the belt structure.

The belt is internally reinforced by five internal cables 48 running the entire length of the belt (FIG. 9). Each cable comprises multiple twisted strands of a high strength wire material e.g. steel or high strength composite. Typically the reinforced belt cross section can be about 2¼" wide and ½" thick. Such a belt has better performance, service life, less noise and lower weight, in high load, high speed operations, compared to conventional drive chains often used in conveyor systems. The belt is sometimes used for raising loads in a vertical path of motion.

Upper wall structure 42 has a flat lower face 50 mating with a flat upper face 52 on lower wall structure 20 to provide space for an adjustable thickness shim means 54. The two wall structures are clamped together on the shim means by two rows of clamping bolts 53. The shim means is used to compensate for manufacturing tolerances that could cause belt 10 to be stressed in the vertical direction. The aim is to have the belt run freely in a horizontal plane, without generating any local stresses at the ends of clamping plates 44. One or more shim plates 54 are placed between faces 50 and 52 to achieve the desired belt condition.

The lower edge area of wall structure 20 carries two ears 55 that support a pivot pin 56 for pusher element 36. As can be seen from FIGS. 3 and 8, the pusher element can swing between the extended operating position (FIG. 3) and the retracted position (FIG. 8). In the extended operating position, the pusher element is adapted to exert a pushing force on the upstanding arm 34 that forms part of the article carrier 25 (FIGS. 1 and 2).

The lower edge area of wall structure 20 mounts to additional ears 58 that support a pivot pin 60 for a retractable snubber element or dog 62. Snubber element 62 also has retention function that keeps arm 34 against the face of pusher element 36 when the carriage is moving at high speed in a right-to-left direction. FIG. 3 shows snubber element 62 in its extended operating condition aligned with arm 34. FIG. 6 shows snubber element 62 pivotably retracted upwardly away from arm 34, whereby the carriage can return in a left-to-right direction back to its starting position without interference by arm 34.

Snubber element (or dog) 62 is held in its extended position (FIG. 3) by a latch element 64 that is swingably mounted on a pivot pin 66 extending downwardly from an overhead ear 67 carried by wall structure 20. The ear can have a spring ball detent 68 mounted therein to releasably retain latch element 64 in either the FIG. 5 position or the FIG. 7 position.

Latch element 64 is operated from the FIG. 5 position to the FIG. 7 position by a stationary abutment rod 70 located near the downstream end of the shuttle track 22, as shown generally in FIG. 1. Latch element 64 is in the FIG. 5 position while the shuttle carriage is moving forwardly in a right-to-left direction. As the shuttle carriage nears the end of its travel, in the forward direction, latch element 64 strikes abutment rod 70 to swing the latch element to the FIG. 7 condition.

With latch element 64 in the FIG. 7 condition, a space is created above the left end of snubber dog 62. The snubber dog can thus pivot upwardly to the FIG. 6 condition when contacted by arm 34 (but only when the carriage nears the end of its forward travel thereby releasing the article carrier).

Carriage 16 travel is limited by mechanisms, not shown in the drawing. Typically the travel limiting function can be accomplished by limit switches electrically connected to motor 14, or by a timer circuit connected to the motor. The present invention is concerned with a mechanism for decelerating the article carrier 24 when the forward stroke of carriage 16 is limited (reached).

Assuming FIG. 6 represents the end of the carriage 16 forward stroke, it will be appreciated that the momentum force generated in article carrier 24 will cause the carrier to continue its leftward motion. Arm 34 will leave pusher element 36 and forcibly impact snubber dog 62.

Abutment rod 70 is preferably located so that latch element 64 strikes rod 70 at, or slightly before, the carriage reaches the end of its stroke. With this arrangement, the momentum force in article carrier 24 is absorbed by snubber dog 62 throughout deceleration while the dog is in the FIG. 3 condition. The article carrier then engages the overhead chain system which removes the carrier from the carriage, and continues through the circuit.

The snubber action requires that the pusher element and snubber element have a specific height relation to arm 34. In order to achieve the desired relation, wall structure 20 is comprised of two wall members separated by a gap occupied by shim means 73. The two wall members are bolted together by bolts 75 (FIG. 3), with the shim plates 73 sandwiched between the mating faces of the wall members.

The function of shim means 73 is to adjust the height of pusher element 36 and snubber element 62 relative to the end of arm 34, so as to achieve optimum snubber performance.

During the return stroke of carriage 16, rod 70 returns latch element 64 to the FIG. 5 condition. When each carriage 16 reaches the starting position the shuttle conveyor is ready to receive the next article conveyor.

FIG. 8 shows the arm 34 on the next article carrier in the process of deflecting the pusher element 36, whereby the next operating cycle can take place.

The drawings necessarily show specific features and structures used to carry out the invention. However, it will be appreciated that some variation in construction and parts arrangement can be made while still practicing the invention.

Having described my invention, I claim:

1. A high-speed shuttle conveyor system comprising:
   two parallel overhead horizontal drive belts;
   an article carrier supported for guided motion along a predetermined path through the space below said drive belts;
   a track means paralleling each drive belt above the path taken by said article carrier;
   a carriage connected to each drive belt for guided movement along said track means;
   each carriage having a pusher means adapted to propel said article carrier at a high speed along said path;
   each carriage having a snubber means for decelerating said article carrier when said carriage reaches a predetermined point on the track means; and
   each said carriage having a clamped connection with its connected drive belt; each carriage comprising an upper wall structure clamped to the connected drive belt; a lower wall structure extending along said track means, and an adjustable thickness shim means joining said upper wall structure to said lower wall structure, whereby transverse stresses on the drive belts are minimized.

2. The shuttle conveyor system of claim 1, wherein said upper wall structure has a flat lower surface, and said lower wall structure has a flat upper surface mating with said flat lower surface; said shim means comprising at least one shim plate sandwiched between said upper and lower surfaces.

3. A high-speed shuttle conveyor system comprising:
   two parallel overhead horizontal drive belts;
   an article carrier supported for guided motion along a predetermined path through the space below said drive belts;
   a track means paralleling each drive belt above the path taken by said article carrier;
   a carriage connected to each drive belt for guided movement along said track means, each said carriage having a clamped connection with its connected drive belt; each clamped connection being adjustable toward or away from said track means to minimize transverse stresses on the drive belts;
   each carriage having a pusher means adapted to propel said article carrier at a high speed along said path; and
   each carriage having a snubber means for decelerating said article carrier when said carriage reaches a predetermined point on the track means.

4. A high-speed shuttle conveyor system comprising:
   two parallel overhead horizontal drive belts;
   an article carrier supported for guided motion along a predetermined path through the space below said drive belts;
   a track means paralleling each drive belt above the path taken by said article carrier;
   a carriage connected to each drive belt for guided movement along said track means;
   each carriage having a pusher means adapted to propel said article carrier at a high speed along said path;
   each carriage having a snubber means for decelerating said article carrier when said carriage reaches a predetermined point on the track means;
   each snubber means comprising a dog swingably mounted on each carriage for swinging motion on a horizontal axis transverse to the movement axis of the carriage;
   said dog having a lowered position preventing the carrier from separating from each pusher means;
   a latch means normally holding said dog in its lowered position; and
   means for disengaging said latch means from said dog when said carriage reaches a predetermined point on the track means.

5. A high speed shuttle conveyor system comprising overhead drive belt means; an article carrier supported for guided motion along a predetermined path through the space below said drive belt means; track means extending parallel to said predetermined path; carriage means connected to said drive belt means for guided movement along said track means; said carriage means having a pusher means adapted to propel said article carrier at a high speed along said predetermined path; and means carried by said carriage means for decelerating said article carrier when said carriage means reaches a predetermined point on the track means;
   said drive belt means being bi-directional, whereby said carriage means moves back and forth between a starting position and an ending position;
   said drive belt means being moveable in a forward direction and then in a rearward direction, whereby said carriage means is cycled back and forth between said starting position and said ending position; and
   a latch means carried by said carriage means for deactivating said deceleration means until said carriage nears said ending position.

* * * * *